Jan. 7, 1941.     G. W. CRABTREE     2,227,535
SPRING COVER
Filed Sept. 15, 1938     3 Sheets-Sheet 1
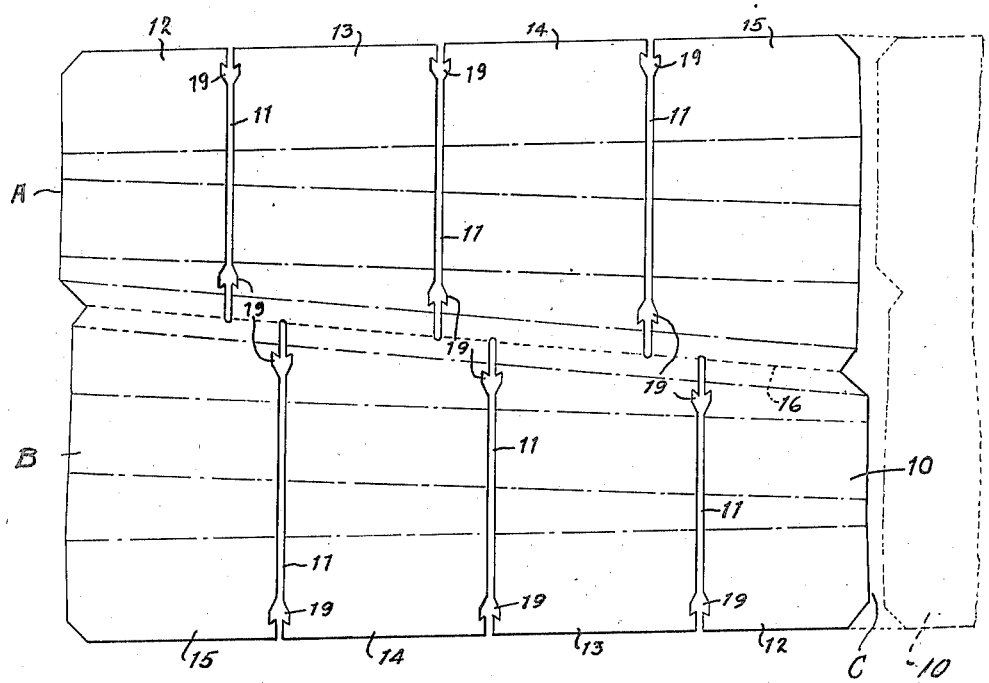
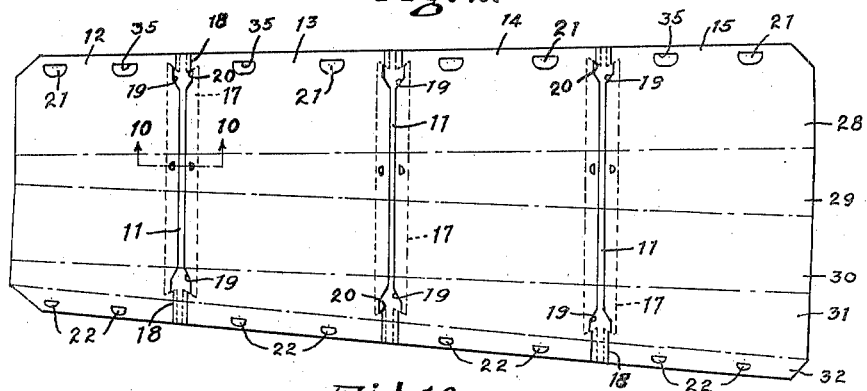
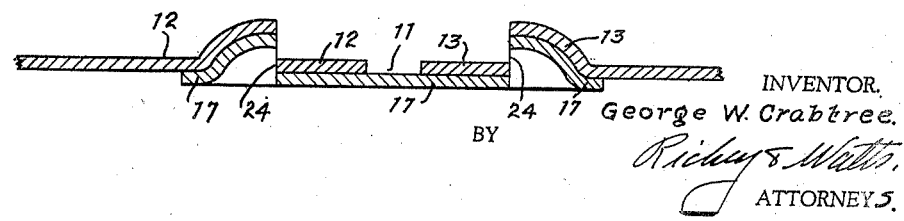
INVENTOR.
George W. Crabtree.
BY
ATTORNEYS.

Jan. 7, 1941.    G. W. CRABTREE    2,227,535
SPRING COVER
Filed Sept. 15, 1938    3 Sheets-Sheet 2

INVENTOR.
George W. Crabtree.
BY
ATTORNEYS

Jan. 7, 1941.     G. W. CRABTREE     2,227,535
SPRING COVER
Filed Sept. 15, 1938     3 Sheets-Sheet 3
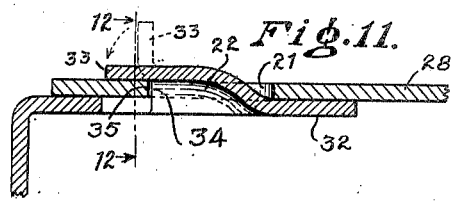
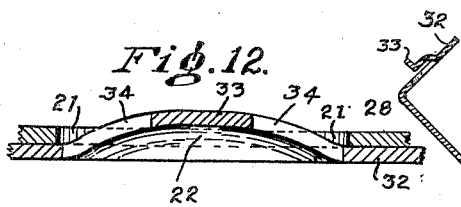
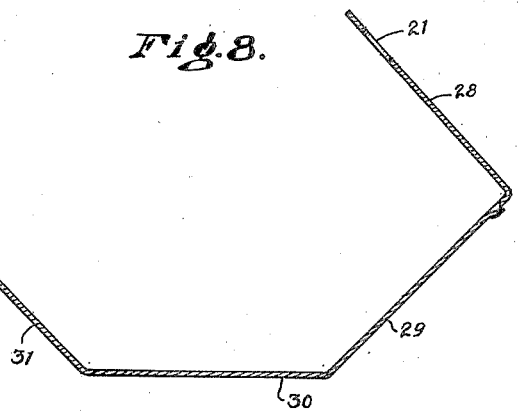
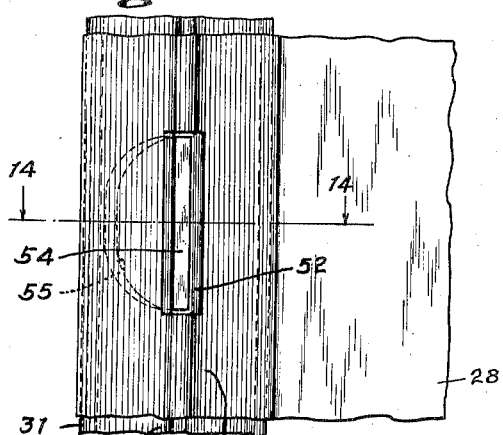
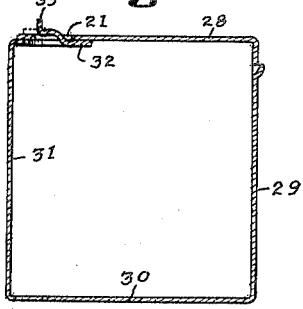
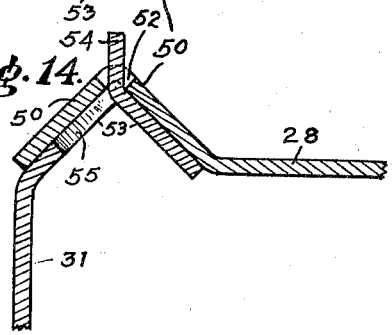
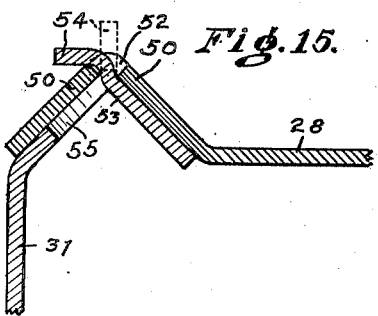
INVENTOR.
George W. Crabtree.
BY
ATTORNEYS.

Patented Jan. 7, 1941

2,227,535

UNITED STATES PATENT OFFICE 2,227,535

SPRING COVER

George W. Crabtree, Cleveland Heights, Ohio

Application September 15, 1938, Serial No. 230,088

7 Claims. (Cl. 267—37)

This invention relates broadly to spring covers and more specifically to an articulated sheet metal cover for laminated vehicle springs.

One of the objects of this invention is to provide a spring cover which embodies a plurality of separate sections connected to each other in such a manner as to move freely in response to the flexure of the spring yet formed so as to retain a lubricant within the cover and preclude the admission of water and foreign matter therein.

Another object of the invention contemplates a design which will accommodate an economic method of assembly, an economic method of fabrication, a method in which the material losses of fabrication are negligible.

A further object of the invention is to provide a method of making a spring cover which comprehends the fabrication of a relatively large blank of sheet metal slotted to form a plurality of sections, the assembly of interlocking strips between such sections and the final fabrication of the sections thus united.

Another object of the invention is to provide a spring cover which comprises spaced cover sections secured to each other by interlocking strips arranged to overlie a portion of the inner and outer faces of the sections throughout portions of their length and arranged to afford a pivotal connection at the points of engagement with the sections.

Another object of the invention is to provide a spring cover blank comprising a series of flat sheet metal sections united successively by transverse strips interwoven between contiguous sections arranged in such a manner that the blank assembly may be folded or bent and clamped in configuration of the spring.

A further object of the invention is to provide a plurality of cover blanks in accordance with the preceding objects which is adapted to accommodate high speed production methods with minimized hand labor in the fabricating operation, sub-assembly and final attachment of the cover upon the spring.

Other objects and advantages more or less ancillary to the foregoing and the manner in which all the various objects are realized will appear in the following description which, considered in connection with the accompanying drawings, sets forth the preferred embodiment of the invention.

Referring to the drawings:

Fig. 1 is a plan view of a sheet of metal after the initial blanking operation has been performed in the manufacture of the spring cover in accordance with the present invention;

Fig. 2 is a plan view of a series of spring cover sections struck from a portion of the blank illustrated in Fig. 1, the sections being united by strips interlocked with the slots shown in Fig. 1, which are formed therein during the blanking operation;

Fig. 8 is a transverse sectional view of an end portion of the cover showing the form in which the sections are bent prior to the assembly thereof upon the spring;

Fig. 9 is a transverse section through a spring cover section showing the form thereof when assembled upon a spring;

Fig. 10 is a longitudinal section through a pair of contiguous spring cover sections and the form of one of the pivotal connections between the connecting strip and spring cover sections, the section being taken on a plane indicated by the line 10—10 in Fig. 2;

Fig. 11 is a transverse section through the free edges of the spring cover illustrating, upon an enlarged scale the form of locking structure;

Fig. 12 is a sectional view through the locking members illustrated in Fig. 11, the section being taken on the plane indicated by the line 12—12 in Fig. 11;

Fig. 13 is a plan view of a fragmentary portion of the edge portions of a spring cover section showing a modified form of the locking mechanism;

Fig. 14 is a transverse section through the locking mechanism illustrated in Fig. 13, the section being taken on a plane indicated by the line 14—14 in Fig. 13;

Fig. 15 is a similar transverse section to that shown in Fig. 14, illustrating the form and position of the members constituting the locking member after the parts are pressed into interlocked engagement.

Figure 3:
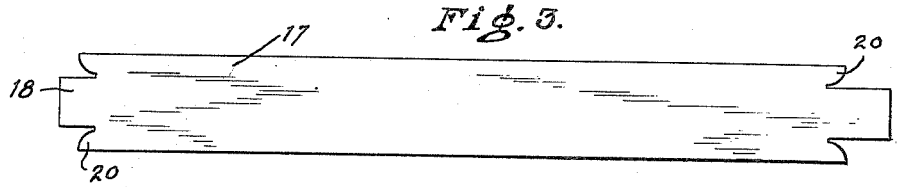
Fig. 3 is a plan view of one of the interlocking strips employed in the manufacture of the improved spring cover.
Figure 4:
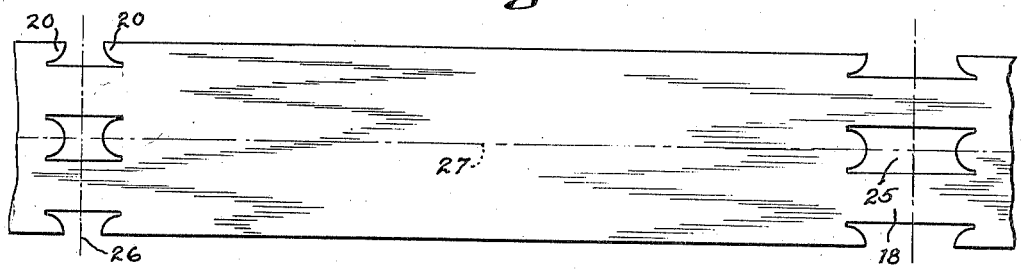
Fig. 4 is a plan view of a partially finished blank of the interlocking strip shown in Fig. 3 illustrating an alternate method of manufacture thereof.

Referring first to Fig. 1, it may be assumed for the purpose of this description that the blank 10 is die struck from a continuous strip of metal of a width substantially equal to the lineal dimension of the spring cover. As the blank 10 is cut from the strip a plurality of slots 11 are pierced therein which define the stock for the separate sections of the cover, for example, the sections 12, 13, 14 and 15 of the spring cover segments A and B. Successive blanks 10 are formed from the strip by advancing the stock under the die slightly beyond the normal length of the blank so that the irregularities in the ends thereof will lie in the scrap strip C and will be sheared in the subsequent blanking operation. The slots 11 extend from the marginal side edges of the blank 10 inwardly terminating slightly beyond the "cutting line" 16 indicated in Fig. 1. After fabrication of the blank 10 strips 17 are superimposed upon the face of the blank over the slots 11, the shouldered end portions 18 thereof being inserted within recesses 19 adjacent the outer ends of the slots. The end portions 18 of the strips are then drawn outwardly and compressively forced against the opposite faces of the blank sections so that the body of the strips 17 will lie in intimate engagement with the edges of the upper faces of the sections while the end portions thereof overlie the edges of the opposed faces of the sections.

As will be seen in Fig. 2, the inclined notches in the recesses 19 and tongued members 20 in the strips 17 are overlapped to effect an interlocked engagement between the contiguous sections of the blanks and the strips. After the strips 17 are thus assembled the blank 10 is sheared along the cutting line 16 and simultaneously pierced with apertures 21 in one marginal edge thereof. Likewise detents 22 are pierced and formed in the strips and contiguous sections adjacent the edges thereof. If desired, the detents may be formed in a separate operation either before the blank 10 is sheared to form the segments A and B. In any event the punch and die constituting the tool set for the last named operation is constructed to pierce or cut both the strip and spring cover sections and deform the metal adjacent the cut in configuration of a quadrant of a sphere (see Fig. 10), so that relative movement may be obtained between the strips 17 and the sections 12 and 13 yet lateral displacement thereof will be arrested by the shoulder 24 formed by the lineal cut during the piercing operation.

The strips 17 may be formed from a continuous strip or ribbon of metal or blanked from a relatively large plate formed with apertures 25 therein fashioned to produce the shouldered end portions 18 and tongue members 20 when the plate is severed along the cutting lines 26 and 27 respectively.

After the strips are assembled with the cover sections as shown in Fig. 2, the assembly is passed through rolls or a forming brake where it is bent, as shown in Fig. 8, to form the cap or cover plate 28, side wall 29, bottom 30, second side wall 31 and flange 32.

Figure 5:
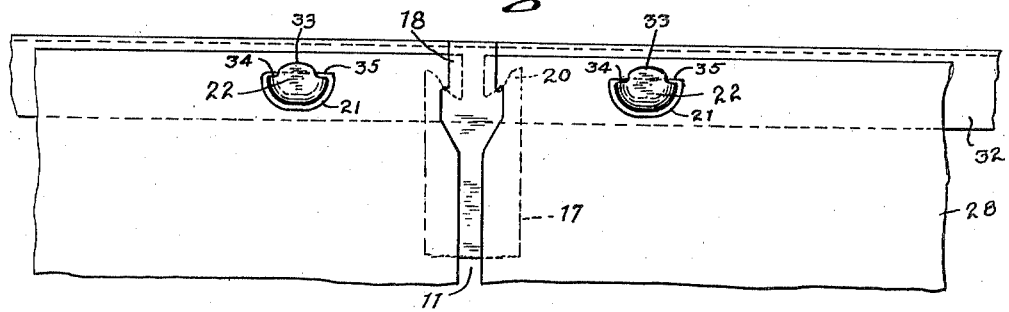
Fig. 5 is a plan view of a fragmentary portion of the spring cover showing the structure of the spring cover latch and the assembled relation of the interlocking strip with a pair of contiguous cover sections.
Figure 6:
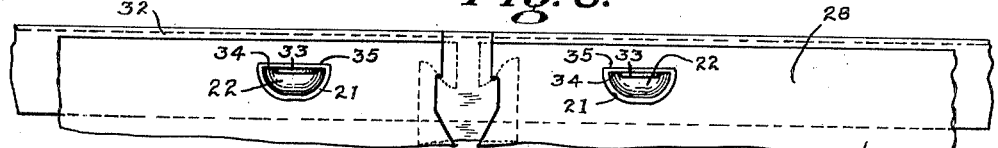
Fig. 6 is a plan view of a fragmentary portion of the cover illustrating the structure of the locking members, the cover locking flange and the position of the locking tabs as they enter the flange but before they are directed in final assembly.
Figure 7:
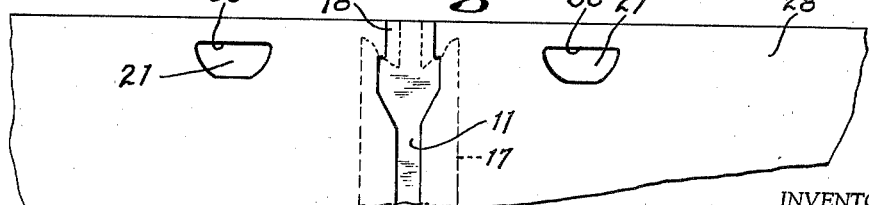
Fig. 7 is a similar plan view of a fragmentary portion of a pair of cover sections showing the apertures constituting the cap locking members and the assembly of the interlocking strips in a pair of contiguous cover sections.

In this operation the angles between the flange and side wall 31 and also the cap and side wall 29 are approximately 90° while the bottom and side walls are preferably bent at such angles as to form an opening between the marginal edges of the cover and flange which will permit the entry of the cover over the portion of spring for which the cover was designed. The spring cover may then be closed by folding the sides 29 and 31 into intimate engagement with the side walls of the spring and with the cap in overlapped relation with the flange, the operation being performed either manually or with the aid of an assembly fixture. When the cap 28 is folded in superposed relation with the flange the metal forming the detents 22 will protrude through the semicircular apertures 21 formed in the marginal edge of the cap. In the construction of the detents 22 the punch employed is formed to pierce the flange 32 and sever therefrom a tongue 33 which is bent upwardly by the continued movement of the tool (see Fig. 11) to facilitate the entry of the tongue within the aperture 21 in the cover or cap. The upturned tongue and adjacent pierced spherical wall of the stock deformed in fabricating the detent forms a lineal shoulder 34, which provides a ledge for the engagement of the lineal edge 35 of the aperture 21. After the cover 28 has been folded in intimate engagement with the flange 32 with the metal forming the upper face of the detents 22 positioned within the apertures 21 and with the edge 35 of the apertures in abutting relation with the lineal shoulder 34 subjacent the tongue 33. The tongue is bent downwardly, as shown in Figs. 5 and 11, to further assure the interlocked engagement of the cap with the flange.

The connection between the edge of the side wall 31 and cover plate or cap may be effected through the modified structure illustrated in Figs. 13, 14 and 15. In this embodiment the marginal edge of the cover 28 is formed with a bead 50 of angular transverse section as shown in Fig. 14. The vertex of the bead 50 is pierced at intervals to provide slots or lineal apertures 52 preferably of greater width than the body of the stock which defines the included angle at the vertex of the bead 50. The free edges of the side walls 31 of the spring cover sections are likewise formed with beaded sections 53 bent in complemental configuration to that of the bead 50. The inner flange of the side wall bead is pierced to provide tongues 54 during the piercing operation, which are bent upwardly to facilitate their reentrant engagement within the apertures 52 in the crest of the bead 50. The tongues 54 are proportioned relative to the width of the bead 50 so that the outer flange of the bead 50 will overlie and completely cover the openings 55 in the bead 53 formed by fabrication of the stock in striking the tongues 54. After the tongues are inserted in the apertures 52 a forming tool or setting die is employed to fold the tongue outwardly so as to assure the adfixture of the cap with the cover side wall.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

I claim:

1. A spring cover comprising a series of separate sections arranged to extend transversely around the sides of a laminated leaf spring, said sections being spaced from each other along adjacent edges and secured to each other only through the medium of a narrow strip, and means to secure said sections to said strip comprising tongues on said strips interlocked with adjacent sections on one face thereof and end portions on said strips interlocked with said sections on the opposite faces thereof.

2. A spring cover assembly comprising a series of separate sections embodying integral cap-and-body portions, said sections spaced from each other and secured together only by interlocking strips, said strips being arranged on the interior of the cover assembly with the end portions of said strips upon the exterior of the cap portions of said sections.

3. A spring cover comprising a series of separate sections arranged transversely of the spring and proportioned to envelop the top, bottom and sides of said spring, said sections being spaced from each other longitudinally of the spring and secured only to each other by strips interlocked with adjacent sections, said strips being proportioned to cover the space between the sections, tongues in said strips in the side edges thereof interlocked with the end portions of said sections within said side walls thereof to permit flexing of the sections with respect to each other in response to spring movement.

4. A spring cover comprising a series of separate sections spaced from each other longitudinally of the spring, means to secure said sections to each other comprising strips proportioned to cover the space between said sections and overlap the ends of adjacent sections, tongues in said strips arranged for re-entrant interlocking engagement with recesses in the edge portions of said sections to secure the sections to the strip and through the medium of the strip secure the sections to each other.

5. A spring cover assembly comprising a series of separate sections each adapted to form a portion of the body and a portion of the cap of the spring cover assembly, said sections being spaced from each other longitudinally of the spring and secured to each other only through interlocking strips, said strips being proportioned to overlap the edges of adjacent sections and close the space therebetween, the edges of said strips and the edges of the adjacent sections being provided with re-entrant portions to effect the arrangement of part of the strips on the interior of the spring cover assembly and other parts of the strip on the exterior of the spring cover assembly.

6. A spring cover comprising a series of separate sections each shaped to provide a body part embracing three sides of a spring and an integral cap part to cover the fourth side of the spring, said sections being spaced from each other longitudinally of the spring and secured to each other by strips, said strips proportioned to overlap the edges of adjacent sections, tongues in the side edges of said strips interlocked with said sections, the end portions of said strips being arranged upon the exterior of said cap part of said cover and the remaining portions of said strips being arranged within said spring cover.

7. A metal spring cover comprising integral body and cap portions, beads in the longitudinal free edges of each portion, said body portion bead being adapted to be received within said cap portion bead, tongues struck from the metal in said body portion beads, said cap portion having apertures therein, said tongues being disposed within said aperture and folded upon said cap beads for effecting the securement of the cap in adfixed relation with said body.

GEORGE W. CRABTREE.